(12) United States Patent
Imfeld et al.

(10) Patent No.: US 7,632,900 B1
(45) Date of Patent: Dec. 15, 2009

(54) LUBRICATING OIL

(75) Inventors: Stephen M. Imfeld, Mason, OH (US); Robert L. Sherman, Jr., Blue Ash, OH (US); Andrew W. Lake, Alvin, TX (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 12/316,949

(22) Filed: Dec. 18, 2008

(51) Int. Cl.
*C08F 2/44* (2006.01)
*C10M 129/10* (2006.01)
*C10M 129/91* (2006.01)
*C08F 110/02* (2006.01)

(52) U.S. Cl. .............................. 526/88; 508/502; 585/3
(58) Field of Classification Search .................. 508/502; 526/88; 585/3
See application file for complete search history.

(56) References Cited

U.S. PATENT DOCUMENTS

| | | | |
|---|---|---|---|
| 3,459,656 A | 8/1969 | Rausch et al. | |
| 3,692,679 A * | 9/1972 | O'Neill | 508/383 |
| 4,116,874 A | 9/1978 | Sugiura et al. | |
| 4,251,347 A | 2/1981 | Rausch et al. | |
| 5,057,206 A | 10/1991 | Engel et al. | |
| 5,156,759 A | 10/1992 | Culpon, Jr. | |
| 5,578,557 A | 11/1996 | Dougan et al. | |
| 5,798,319 A | 8/1998 | Schlosberg et al. | |
| 5,997,732 A | 12/1999 | Yenni et al. | |
| 6,172,014 B1 | 1/2001 | Meyers | |
| 6,329,327 B1 | 12/2001 | Tanaka et al. | |
| 6,656,887 B2 | 12/2003 | Yagishita et al. | |
| 6,756,346 B1 | 6/2004 | Baba et al. | |
| 2002/0006878 A1 * | 1/2002 | Abraham et al. | 508/186 |
| 2002/0065201 A1 * | 5/2002 | Ribeaud et al. | 508/375 |

* cited by examiner

*Primary Examiner*—Fred M Teskin
(74) *Attorney, Agent, or Firm*—John Tyrell; Jonathan L. Schuchardt

(57) ABSTRACT

A lubricating oil suitable for use in α-olefin compressors and a high-pressure ethylene polymerization process is disclosed. The oil comprises a base fluid and a hindered $C_6$-$C_{30}$ alkyl 4-hydroxybenzoate. The hindered $C_6$-$C_{30}$ alkyl 4-hydroxybenzoate stabilizes the lubricating oil and does not interfere with the high-pressure α-olefin polymerization.

7 Claims, No Drawings

LUBRICATING OIL

FIELD OF THE INVENTION

The invention relates to lubricating oils useful in α-olefin compressors, particularly compressors used in high-pressure ethylene polymerization processes.

BACKGROUND OF THE INVENTION

Lubricating oils are commonly used in compressors to reduce friction, enhance sealing, and remove heat in cylinders and crankcase assemblies. Cylinder lubricating oils are formulated with one or more inhibitors to help prevent ethylene polymerization inside the compressor and elsewhere in the process piping. The oil lubricates a cylinder assembly that may have sealing rings moving against a stationary surface or stationary sealing rings bearing on a moving surface. Due to loads developed at high pressure, these components are usually metallic. Typical base fluids for these lubricating oils include mineral oils and a variety of synthetic oils. Additives are included for corrosion protection, metal passivation, anti-wear, oxidative stability, viscosity modification, lubricity, and other purposes. Because of the demanding applications, much research has been done to improve lubricating oils.

For example, U.S. Pat. No. 4,116,874 discloses a compressor oil comprising a mineral oil, an aromatic amine, a triester of dithiophosphoric acid, and an alkyl phenol selected from a list of six hindered phenols, none of which is a 4-hydroxybenzoate.

U.S. Pat. No. 5,156,759 discloses a high-temperature compressor oil comprising a poly-α-olefin, an ester oil, a rust inhibitor, and an antioxidant comprising octylbutylphenylamine and a t-butyl phenolic antioxidant. Fourteen hindered phenols are mentioned in the description but none of them is a 4-hydroxybenzoate.

U.S. Pat. No. 5,798,319 teaches a synthetic oil and various additives including viscosity modifiers, dispersants, detergents, anti-wear agents, friction modifiers, corrosion inhibitors, rust inhibitors, demulsifiers, antifoam agents, and antioxidants. Hindered phenols are recommended antioxidants, but no examples are given, and a 4-hydroxybenzoate is not mentioned.

U.S. Pat. No. 6,329,327 discloses a lubricant containing an organic molybdenum compound. Other additives are mentioned including phosphites and hindered phenols. More than forty-five hindered phenols are mentioned, but none of them is a 4-hydroxybenzoate.

U.S. Pat. No. 6,656,887 teaches a lubricating oil with a phosphate. Hindered phenol antioxidants are mentioned and more than twenty examples are given. None of them is a 4-hydroxybenzoate.

U.S. Pat. No. 6,756,346 discloses a lubricating oil composition with an antiwear compound and a rust preventer. More than thirty-five hindered phenols are mentioned as possible antioxidant additives, but none of them is a 4-hydroxybenzoate.

U.S. Pat. No. 6,756,346 discloses a lubricating oil composition containing an antiwear additive and a rust preventing additive. Hindered phenols are mentioned as antioxidants and a long list is given as examples. None is a 4-hydroxybenzoate.

U.S. Pat. No. 5,578,557 discloses a compressor oil suitable for the manufacture of polyethylene. The oil comprises a base fluid such as white oil, a sarcosine derivative for friction protection, an imidazoline corrosion inhibitor, and an amine phosphate. Hindered phenols are identified as possible antioxidant additives, but no 4-hydroxybenzoates are mentioned. Corrosion and wear testing is reported, but there is no information on the ethylene polymerization.

According to U.S. Pat. No. 6,172,014, "the escalating requirements for lubricants used in compression cylinders associated with the dynamic sealing of ethylene . . . is considered one of the most demanding aspects of high-pressure manufacture of polyethylene." A phosphite in combination with a second antioxidant is recommended. Hindered phenols are listed as suitable second antioxidants. Different types of suitable hindered phenols are described, but none is a 4-hydroxybenzoate.

Despite the considerable research and myriad of formulations tested, there remains a need for improved lubricating oils for use in α-olefin compressors. Hindered phenol antioxidants, especially hindered phenols with electron donating groups such as alkyl or alkoxy in the para position, help to minimize oxidation of the oil. However, using antioxidants has tradeoffs. Usually, traces of the lubricating oil enter the high-pressure polymerization reactor along with the α-olefin, so the lubricant's antioxidant can interfere with the polymerization or cause erratic behavior, especially during a process start-up. Thus, the need remains for a lubricating oil that has sufficient oxidative stability but also has a limited impact on the α-olefin polymerization.

SUMMARY OF THE INVENTION

In one aspect, the invention is lubricating oil. The oil is useful in α-olefin compressors, particularly those used in a high-pressure ethylene polymerization process. The lubricating oil comprises a base fluid and a hindered $C_6$-$C_{30}$ alkyl 4-hydroxybenzoate. The lubricating oil is valuable for α-olefin compressors because it provides oxidative stability without interfering with the subsequent high-pressure polymerization.

The invention includes a high-pressure polymerization process. The process comprises compressing ethylene in a cylinder with a lubricating oil of the invention, transferring the compressed ethylene to a reactor, and polymerizing the ethylene at a pressure exceeding 70 MPa.

DETAILED DESCRIPTION OF THE INVENTION

The invention relates to a lubricating oil suitable for use in α-olefin compressors. The oil comprises a base fluid and a hindered $C_6$-$C_{30}$ alkyl 4-hydroxybenzoate. The base fluid is a mineral or synthetic oil or a mixture thereof. Synthetic oils are made from other chemicals rather than by a conventional crude oil refining process. Suitable synthetic oils include poly(α-olefins), polybutenes, and products of the Fischer-Tropsch process. Mineral oil is a distillate of petroleum. It can be a paraffinic, naphthenic, or mixed base oil. Blends of oils of various viscosities and compositions may also be used instead of a single oil. By "mineral oil," we include "white oil," also sometimes referred to as "white mineral oil." White mineral oil is prepared from a distillate of petroleum crude oil. Preparation of white mineral oil generally includes one or more upgrading steps for purifying the oil. Common upgrading steps include hydrotreating, hydrogenation, filtering, solvent refining, and dewaxing. For a discussion of white mineral oil, see U.S. Pat. Nos. 3,459,656, 4,251,347, 5,057,206, and 5,997,732, the teachings of which are incorporated herein by reference. Preferably, the base fluid is a mineral oil. More preferably, the base fluid is a white mineral oil.

The lubricating oil is suitable for use in α-olefin compressors. The compressor can be any that is suitable for compressing α-olefins to allow high-pressure polymerization. Generally, compressors involve movement of a piston inside a cylinder. Often they have a series of two or more compression sections, sometimes called compression stages. The α-olefin is preferably ethylene, propylene, 1-butene, 1-hexene, 1-octene, and mixtures thereof. Most preferably, the α-olefin is ethylene.

The lubricating oil contains a hindered $C_6$-$C_{30}$ alkyl 4-hydroxybenzoate. By "hindered," we mean that there is at least one substituent at the 3- or 5-position of the aromatic ring, i.e., ortho to the hydroxyl group. Preferably, there is a substituent at both the 3- and 5-positions. Preferably, the substituent is a $C_1$-$C_7$ hydrocarbyl group such as methyl, isopropyl, t-butyl, phenyl, or benzyl. Most preferably, both the 3- and 5-positions are substituted with a t-butyl group.

Preferably, the hindered $C_6$-$C_{30}$ alkyl 4-hydroxybenzoate has the structure:

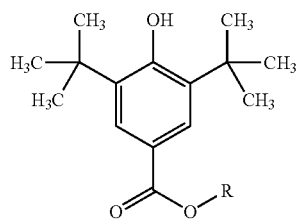

wherein R is $C_6$-$C_{30}$ alkyl. More preferably, R is $C_{10}$-$C_{20}$ alkyl, even more preferably $C_{1-6}$ alkyl. Most preferably, R is n-hexadecyl. Preferably, the lubricating oil contains 0.01 to 1.0% by weight of the hindered $C_6$-$C_{30}$ alkyl 4-hydroxybenzoate.

Optionally, a second antioxidant is used in combination with the hindered $C_6$-$C_{30}$ alkyl 4-hydroxybenzoate. Suitable second antioxidants include, e.g., amine, sulfur, phosphorus, and phenolic antioxidants, and combinations thereof. For examples of suitable antioxidants, see U.S. Pat. No. 6,756,346, the teachings of which are incorporated herein by reference. Preferably, less than 0.5 wt. %, typically 50 to 3000 ppm, of the second antioxidant is used because it can adversely affect the high-pressure polymerization. Most preferably, a second antioxidant is not used, and the oxidative stability is imparted by the hindered $C_6$-$C_{30}$ alkyl 4-hydroxybenzoate.

Preferably, the lubricating oil further comprises other additives such as corrosion inhibitors, viscosity modifiers, lubricity aids, rust inhibitors, and metal deactivators. For examples of suitable additives, see U.S. Pat. No. 6,656,887, the teachings of which are incorporated herein by reference. Most preferably, the lubricating oil further comprises a viscosity modifier such as polybutene, a lubricity aid such as an amine phosphate, and a corrosion inhibitor, such as a tolyltriazole compound.

The invention includes a high-pressure ethylene polymerization process. Ethylene is compressed in a cylinder with a lubricating oil and is transferred to a polymerization reactor at a pressure exceeding 70 MPa. The lubricating oil comprises a base fluid and a hindered $C_6$-$C_{30}$ alkyl 4-hydroxybenzoate, wherein the base fluid is selected from the group consisting of mineral oil, synthetic oil, and mixtures thereof. By "high pressure," we mean a pressure exceeding 70 MPa. More preferably the pressure is within the range of 100 to 400 MPa, most preferably from 200 to 300 MPa. A single reactor or a combination of reactors is used. The reactor design can be any that is suitable for high-pressure ethylene polymerization. Stirred autoclave reactors (including CSTRs), tubular reactors, and combinations thereof are suitable. The high-pressure ethylene polymerization process is useful for preparing low density polyethylene (LDPE) and is believed to proceed by a free-radical mechanism. Preferably air, oxygen, or a peroxide is added to provide a source of free radicals.

Preferably, ethylene, initiator(s), and chain-transfer agents are fed into the reactor. Optionally, comonomers, such as vinyl acetate, can also be utilized. Preferably, the reactor feeds are brought into a reactor preheater, and the temperature of the feeds are changed such that the initiator will start the free-radical polymerization reaction. The amount and type of initiator will determine the reactor temperature. A typical range of reactor temperatures is 120° C. to 350° C., depending on reactor design, comonomer, and product characteristics. Typical conversion rates of ethylene to polyethylene range from 12 to 36%. Typically, the mixture of polyethylene and ethylene are separated, the unreacted ethylene is recycled back to the compression stage, and the polyethylene and additives are then extruded and pelletized.

Commonly, traces of the lubricating oil pass from the compressor to the polymerization reactor and ultimately remain in the LDPE. Generally, the inventive process provides LDPE that contains 100 to 2000 ppm, more commonly 500 to 1000 ppm, of the lubricating oil. Use of a hindered $C_6$-$C_{30}$ alkyl 4-hydroxybenzoate imparts oxidative stability to the oil while allowing the α-olefin polymerization to proceed.

The following examples merely illustrate the invention. Those skilled in the art will recognize many variations that are within the spirit of the invention and scope of the claims.

Oxidative Induction Time (OIT)

Test Method

Lubricating oils are analyzed by differential scanning calorimetry (DSC) to determine the oxidative induction time (OIT) or time to auto-oxidation. The method is adapted from ASTM D3895, *Standard Test Method or Oxidative-Induction Time of Polyolefins by Differential Scanning Calorimetry*. The method resembles ASTM D3895 but uses a different temperature range, sample size and gas purge time for the analysis of oil samples. Additionally, the instrument is calibrated in accord with the manufacturer's instructions using indium and zinc instead of using the ASTM protocol.

The oils are analyzed using a Mettler-Toledo DSC-1 differential scanning calorimeter. Oil samples (10-11 mg) are pipetted into a 40-mL open aluminum pan and analyzed using the following instrument conditions:

Initial purge gas: nitrogen @ 50 mL/min. Initial temperature: 100° C. The following heating program is used: (1) heat the sample to 175° C. @ 20° C./min.; (2) hold isothermally @ 175° C. for 2 min.; (3) switch the purge gas to oxygen @ 50 mL/min.; (4) hold isothermally @ 175° C. for 120 min.; and (5) switch the purge gas to nitrogen @ 50 mL/min.; purge 2 min.

OIT (min.) is reported as the onset of the oxidative exotherm. In general, a longer OIT corresponds to greater oxidative stability.

EXAMPLE 1

A lubricating oil is made by combining white mineral oil with n-hexadecyl 3,5-di-t-butyl-4-hydroxybenzoate (4,000 ppm, available from Cytec Industries Inc. as Cyasorb® UV-2908 light stabilizer). The oxidative induction time is determined using the test method described above. The lubricating oil has an OIT of 26 min.

EXAMPLE 2

Example 1 is repeated with n-hexadecyl 3,5-di-t-butyl-4-hydroxybenzoate (3,000 ppm) and tetrakis[methylene-3-(3,5-di-tert-butyl-4-hydroxyphenylpropion-ate)]methane (500 ppm, available from Ciba as Irganox® 1010). The lubricating oil has an OIT of 32 min.

EXAMPLE 3

Example 2 is repeated with n-hexadecyl 3,5-di-t-butyl-4-hydroxybenzoate (3,000 ppm) and Irganox 1010 (1,000 ppm). The lubricating oil has an OIT of 59 min.

COMPARATIVE EXAMPLES 4-8

Lubricating oils are made by combining white mineral oil with known hindered phenol additives, including: Irganox 1010; 2,6-di-t-butyl-4-methylphenol (BHT); and α-tocopherol (Vitamin E). Vitamin E imparts poor color and is not further tested. OIT results are shown in Table 1.

TABLE 1

Oxidative Induction Times for Stabilized White Mineral Oil

| Ex. | Additive (amount in ppm) | OIT (min.) |
|---|---|---|
| 1 | Cyasorb ® UV-2908 (4000) | 26 |
| 2 | Cyasorb UV-2908 (3000); Irganox ® 1010 (500) | 32 |
| 3 | Cyasorb UV-2908 (3000); Irganox 1010 (1000) | 59 |
| C4 | BHT (5000) | 8 |
| C5 | Irganox 1010 (500) | 17 |
| C6 | Irganox 1010 (1500) | 42 |
| C7 | α-Tocopherol (Vitamin E) (5000) | Not tested |
| C8 | None (control) | 6 |

The results show that a hindered $C_6$-$C_{30}$ alkyl 4-hydroxybenzoate effectively stabilizes the lubricating oil. Example 1 has an OIT of 26 minutes compared with the control of 6 minutes. The hindered $C_6$-$C_{30}$ alkyl 4-hydroxybenzoate can be used in combination with a second antioxidant as shown in Examples 2 and 3. Lubricating oils of the invention (Examples 1-3) are superior to the control (Comparative Example 8) and to the well-known antioxidant BHT (Comparative Example 4). They are superior to very low levels of Irganox 1010 (Comparative Example 5) and comparable to higher levels of Irganox 1010 (Comparative Example 6), although high levels of antioxidants can interfere with the polymerization reaction.

EXAMPLE 9

A lubricating oil is made by combining white mineral oil (93 parts by weight); a polybutylene viscosity modifier (6 parts, Indopol®H-100, available from Amoco Chemical Company); an amine phosphate lubricity aid (0.5 parts, Irgalube® 349, available from Ciba); tolyltriazole corrosion inhibitor (0.1 parts, Irgamet® 39, available from Ciba); n-hexadecyl 3,5-di-t-butyl-4-hydroxybenzoate (0.1 parts, Cyasorb UV-2908 light stabilizer), and Irganox 1010 (0.05 parts).

The lubricating oil is used in a compressor that compresses ethylene and feeds it to a high-pressure polymerization reactor. A mixture of tert-butyl peroxy-2-ethylhexanoate (6 ppm based on ethylene) and tert-butyl peroxyacetate (68 ppm based on ethylene) is fed to the reactor. Pressure is maintained at 250 MPa. Ethylene polymerization initiates immediately and proceeds in a controlled fashion to produce LDPE. After use, the lubricating oil is substantially unchanged.

COMPARATIVE EXAMPLE 10 if the procedure of example 9 is repeated without n-hexadecyl 3,5-di-t-butyl-4-hydroxybenzoate, the lubricating oil, after use, is expected to be deteriorated and discolored.

COMPARATIVE EXAMPLE 11 if the procedure of example 9 is repeated with irganox 1010 (0.5 parts by weight) and no n-hexadecyl 3,5-di-t-butyl-4-hydroxybenzoate, the polymerization is expected to have a delayed initiation in the reactor, resulting in poor control of the polymerization reaction.

The preceding examples are meant only as illustrations. The following claims define the invention.

We claim:

1. A lubricating oil, suitable for use in α-olefin compressors, said oil comprising a base fluid and a hindered $C_6$-$C_{30}$ alkyl 4-hydroxybenzoate wherein the base fluid is selected from the group consisting of mineral oil, synthetic oil, and mixtures thereof and wherein the hindered $C_6$-$C_{30}$ alkyl 4-hydroxybenzoate has the structure:

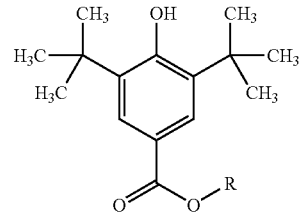

wherein R is $C_6$-$C_{30}$ alkyl.

2. The lubricating oil of claim 1 wherein the base fluid is a white mineral oil.

3. The lubricating oil of claim 1 wherein R is $C_{16}$ alkyl.

4. The lubricating oil of claim 3 wherein R is n-hexadecyl.

5. The lubricating oil of claim 1 comprising 0.01 to 1.0% by weight of the hindered $C_6$-$C_{30}$ alkyl 4-hydroxybenzoate.

6. The lubricating oil of claim 1 further comprising 50 to 3000 ppm of a second antioxidant.

7. A process comprising: (a) compressing ethylene in a cylinder with the lubricating oil of claim 1; (b) transferring the compressed ethylene to a reactor; and (3) polymerizing the ethylene at a pressure exceeding 70 MPa.

\* \* \* \* \*